April 6, 1965 D. T. EGGEN ETAL 3,177,124
REACTOR EXCURSION FUSE
Filed Oct. 31, 1960

*INVENTORS*
DONALD T. EGGEN
BY   HARRY A. MOREWITZ

*Gerald A. Koris*
ATTORNEY

United States Patent Office 3,177,124
Patented Apr. 6, 1965

3,177,124
REACTOR EXCURSION FUSE
Donald T. Eggen, Santa Susana, and Harry A. Morewitz, Tarzana, Calif., assignors to North American Aviation, Inc.
Filed Oct. 31, 1960, Ser. No. 66,000
4 Claims. (Cl. 176—86)

Our invention relates to a fuse device, and more particularly to a fuse device for a nuclear reactor which will damp a nuclear excursion.

Nuclear reactors are normally controlled by rods containing neutron poisons which change position in the core in response to signals delivered from the reactor instrumentation. In addition, self-contained, independently actuated fuses have been developed as back-up safety devices. A typical such safety fuse is described in Report NAA-SR-1761, available from the Office of Technical Services, U.S. Department of Commerce, Washington, D.C. This fuse comprises basically a device which releases a neutron poison gas, such as $BF_3$, from a small volume into a larger volume in response to an increase in neutron flux. The smaller and larger volumes are separated by a communicating line which contains a solder plug. The plug is surrounded by a uranium 235 heater, which in response to an increase in neutron flux causes the solder plug to melt, thereby venting the $BF_3$ gas into the larger volume and effecting a decrease in reactivity. While such devices are generally satisfactory, there are nonetheless certain disadvantages to their use. For instance, the $BF_3$ gas is still a neutron poison even in the unreleased smaller volume, and an economic penalty for lost neutrons is paid. Further, the fuse devices are generally of the same outer dimensions as the fuel elements and are inserted into fuel element positions in the core; perturbation of the neutron flux therefore results, aggravating peak-to-average flux levels across the reactor core. Safety devices employing poison materials are also less effective in epithermal and fast reactors, because the neutron absorption cross section of poison materials drops with increasing energy of incident neutrons.

Therefore, the principal object of our present invention is to provide a safety fuse device for a nuclear reactor which does not contain neutron poison material.

Another object is to provide a safety fuse device for a nuclear reactor which does not perturb neutron flux.

Another object is to provide such a fuse, which in response to a reactor transient, will increase neutron leakage, thereby damping the chain reaction.

Another object is to provide such a safety device which operates by separating reactor core components.

Still another object is to provide a reactor safety device which operates to decrease the effectiveness of the reflector of the reactor.

Still another object is to provide such a fuse which will expand core components rapidly, moving fuel, moderator, or reflector material away from the center of the reactor core, thereby reducing the reactivity of the reactor.

A further object is to provide such a device which is as effective in epithermal or fast reactors as in thermal reactors.

A still further object is to provide such a fuse device which is independently actuated and not dependent upon associated reactor instrumentation.

Other objects and advantages of our invention will become apparent from the following detailed description, taken together with the appended drawings.

Our fuse device comprises basically a foil of U-235 or other fissile material which is incorporated in severable rod on which layers of moderator, reflector, and/or fuel are stacked in the core of a reactor. Flat springs between such layers are normally in a compressed state. This provides stored energy which expands the assembly when a low melting material holding together the severable rod melts upon heating by the U-235 during a reactor transient, permitting the rod to break apart and expand the core components. Expansion of the core components increases neutron leakage, thereby decreasing reactivity.

This device has a number of distinct advantages over prior art safety fuses. A poison material is not used, thereby avoiding neutron flux perturbations. Further, it is particularly effective for use in epithermal or fast reactors since it works on a neutron leakage rather than absorption basis. It is also particularly effective in critical assemblies where safety considerations are always paramount, and mechanical separation of the core components is slow.

Figure 1:
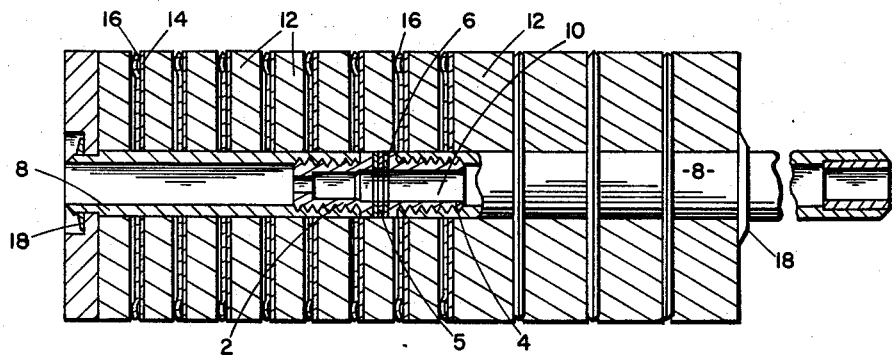
FIG. 1 is a longitudinal sectional view, partly in elevation, of one embodiment of the fuse device in its normal, untriggered position.
Figure 2:
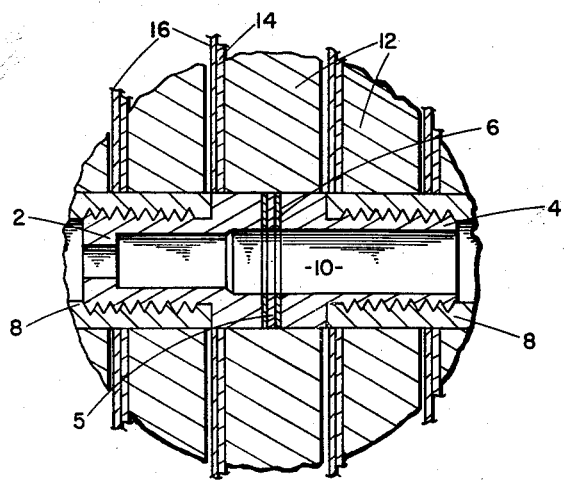
FIG. 2 is an enlarged fragment of FIG. 1, showing the fuse detail.

Turning now to the drawings, FIG. 1 shows the excursion fuse device in a normal (compressed) condition. As seen in the enlarged fragment in FIG. 2 the fuse includes two symmetrical metal links 2 and 4 separated by a foil 5 of U-235 or other fissile material, joined together by a soldered butt joint 6. The outer diameter of each link is threaded for fastening into a split tube 8. The interior 10 of metal links 2 and 4 is hollow and tapered to receive a rod for adjusting the position of the fuse device in a reactor core. Mounted on tube 8 are a plurality of discrete reactor core material segments 12. By the term "reactor core material" we intend to define at least one solid material which plays a vital function in the initiation and maintenance of a nuclear chain reaction, such as the reactor fuel, moderator, and reflector materials. In the particular embodiment shown in the figures, the core material segments 12 mounted on tube 8 are layers of moderator material, such as graphite, beryllium or beryllium oxide, metal hydrides of metals having relatively low neutron cross section such as zirconium hydride, or hydrocarbon plastic materials such as polyethylene and polystyrene. Thin layers of fissile material 14 are also mounted on tube 8 between layers of moderator material 12, on the left hand side of the drawing. This would be a fueled region of a reactor, while the region on the right hand side is an unfueled reflector region. Other arrangements of reactor core materials on tube 8 may be made within the scope of our invention according to particular reactor design requirements. Any fissile material in solid form is suited for use in our invention, and the use of any particular fuel form is not critical. It may comprise, for instance, uranium metal, uranium metal alloys, such as uranium-aluminum, uranium-thorium, uranium-molybdenum, ceramic materials such as $UO_2$ and $UC$, and dispersions or alloys of such fuel materials in the above moderator materials. Springs 16 are mounted on the central tube between the fuel and moderator layers; they are compressed by crimp washers 18 at the ends of tube 8. The springs may be of any metal of relatively low neutron absorption cross section, for example, stainless steel and Cu-Be alloy.

Figure 3:
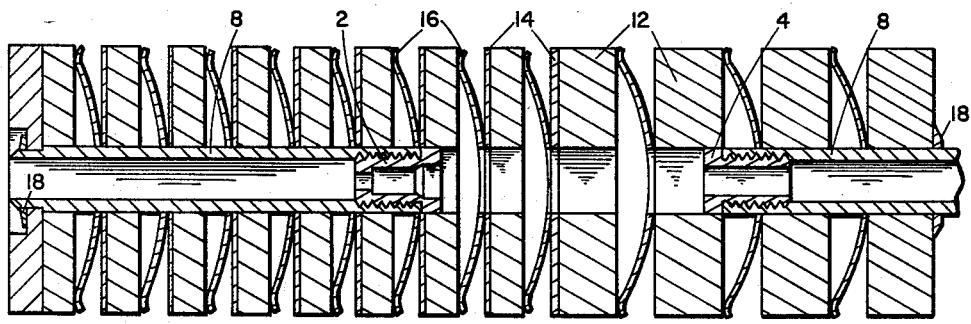
FIG. 3 shows the same fuse device in expanded state after triggering by a nuclear excursion.

The U-235 foil 5 next to the soldered butt joint heats up during a reactor transient, melting the solder and separating links 2 and 4. The springs are thus permitted to expand the fuse assembly to the position shown in FIG. 3. The expansion of the reactor core components to the larger volume increases neutron leakage, and thereby dampens the nuclear chain reaction.

The materials of the joint and the melting point of the solder are so chosen that the fuse will trigger under transient conditions before the reactor fuel temperature reaches the melting point, thus protecting the assembly from damage. In the case of a critical assembly employing the fuse in the reflector portion of the core, the link is of Monel, the tube of aluminum, the solder 42 weight percent tin–58 weight percent bismuth melting at 138.6° C., the moderator of polyethylene, and the fuel uranium-aluminum alloy containing 20 percent uranium of about 90 percent enrichment with respect to U–235. The springs are stainless steel set to 30 lbs. pressure. The fuse is set to trigger at an integrated flux of about $10^{14}$ $nvt$. Employing the fuse device at the end of each separate reflector member in the critical assembly, a total of 800, a 50 percent expansion of the reflector region upon triggering provides a 3 percent reduction in reactivity.

It should be understood that the foregoing is only illustrative rather than restrictive of our invention, and that our invention is easily adaptable by those skilled in the art to use in any reactor type. Therefore, our invention should be understood to be limited only as is indicated in the appended claims.

We claim:

1. A safety device for a nuclear reactor comprising a plurality of reactor core component segments coaxially mounted, a plurality of spring members positioned between and connecting said segments, a separable member adapted to hold said springs in a compressed state, said separable member comprising links joined together by a relatively low-melting material, and a fissile material juxtaposed to said low-melting material, the heat generated by said fissile material upon a reactor transient melting said low-melting material, thereby permitting said springs to expand and separate said reactor core maetrials.

2. A safety fuse device for a nuclear reactor comprising a plurality of reactor core component segments in a close array; expansible means for separating said segments; and separable flux responsive means adapted to hold said expansible means in a compressed state, said separable means comprising links joined by a relatively low-melting material, and a fissile material juxtaposed to said low-melting material; the heat generated by the fissile material upon a flux increase metling said low-melting material, thereby releasing said compressed expansible means and separating said core segments, thus increasing neutron leakage.

3. The device of claim 2 wherein said reactor core component segments are neutron reflector segments.

4. A safety fuse device for a nuclear reactor comprising a separable support member having at least first and second link portions, a plurality of reactor core material segments mounted on said support member, respective ones of a plurality of spring members positioned between adjacent ones of said segments, a fusible element having a relatively low-melting material and a fissile material adjacent to said low-melting material, said fusible element joining said first and second link portions in a first position so that said spring members are suitably compressed in said first position, the heat generated in said fissile material upon an increase in neutron flux beyond a predetermined point melting said low-melting material so that said spring members expand to move said core material segments from said first position to an expanded second position.

References Cited by the Examiner

UNITED STATES PATENTS 3,042,599  7/62  Biehl _____ 176—92 X

OTHER REFERENCES

KAPAL–M–LBV–7 (AEC Report), "Reactor Safety Fuses," L. B. Vandenberg, September 23, 1955, p. 33.

"Nucleonics," vol. 17, No. 1, January 1959, p. 84.

CARL D. QUARFORTH, *Primary Examiner.*

REUBEN EPSTEIN, ROGER L. CAMPBELL,
*Examiners.*